United States Patent [19]
Samuels et al.

[11] 4,014,126
[45] Mar. 29, 1977

[54] SLINGSHOT-ACTION FISHING ROD
[75] Inventors: Wiley H. Samuels, Chicago; James M. Murray, Oak Lawn, both of Ill.
[73] Assignee: Wiley H. Samuels, Chicago, Ill.
[22] Filed: Mar. 26, 1976
[21] Appl. No.: 670,632
[52] U.S. Cl. .................................. 43/19; 43/21.2; 43/25; 124/20 R
[51] Int. Cl.² ........................................ A01K 91/02
[58] Field of Search ............... 43/19, 21.2, 25; 124/20 R

[56] References Cited
UNITED STATES PATENTS

| 1,092,548 | 4/1914 | Weber | 43/21.2 |
|---|---|---|---|
| 1,376,260 | 4/1921 | Davis | 43/19 |
| 2,665,866 | 1/1954 | Goldinger | 43/21.2 |
| 2,672,857 | 3/1954 | Gauthier | 124/20 R |
| 2,775,838 | 1/1957 | Miller | 43/21.2 |
| 2,823,483 | 2/1958 | Malott | 43/19 |
| 2,948,078 | 8/1960 | Miotke | 43/19 |
| 3,683,882 | 8/1972 | Braxton | 43/19 |

Primary Examiner—Louis G. Mancene
Assistant Examiner—Daniel J. Leach

[57] ABSTRACT

An attachment for fishing rods for the slingshot casting of the fishing line. The attachment is clamped to the fishing rod and extends forwardly with pivoted spring arms. When these are swung back to vertical position they become fixed; and the elastic sling extends rearwardly from the same. The arms are also swingable downwardly to lock as props for supporting the fishing rod on the ground or on the deck of a boat.

10 Claims, 4 Drawing Figures

SLINGSHOT-ACTION FISHING ROD

Our invention relates to fishing rods which are made shorter than the conventional type because they use the slingshot principle to cast the line. Such fishing rods are therefore only a few feet long for convenient storage and transportation; and they can be made even shorter by telescoping the extending part of the rod.

A slingshot-action fishing rod must fulfill a number of requirements in order to be efficient. One requirement is lateral compactness; and the first object of the present invention is to design a sling coupling which lies close to the sides of the fishing rod when not in use, so that the improved rod will be compact for storage and handling.

A further object is to dispose the sling coupling in a manner to be locked in upright position when the sling is to be used for casting the line.

Another object is to design the sling coupling in a manner to swing down and become locked as a stand or prop when the fishing rod is set on the ground or in a boat to await a catch.

A final object is to construct the novel slingshot facility primarily as a simple attachment readily applicable to fishing rods that are short or have been shortened to gain the advantages of the present invention.

A better understanding of the invention may be gained by reference to the accompanying drawing, in which.

Figure 1:
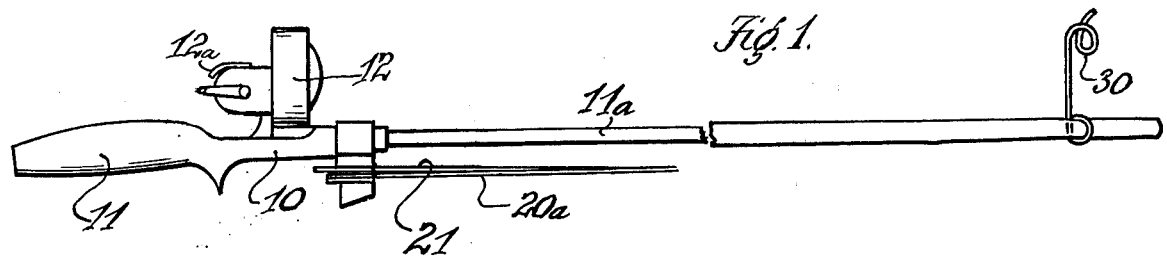
FIG. 1 is a side view on a miniature scale showing the improved fishing rod, broken off and enlarged at the right-hand end.

Referring specifically to the drawing, 10 denotes the shank of the fishing rod, 11 its handle, 11a the frontal extension, 12 the reel, and 13 the rotary handle for operating the same.

Figure 4:
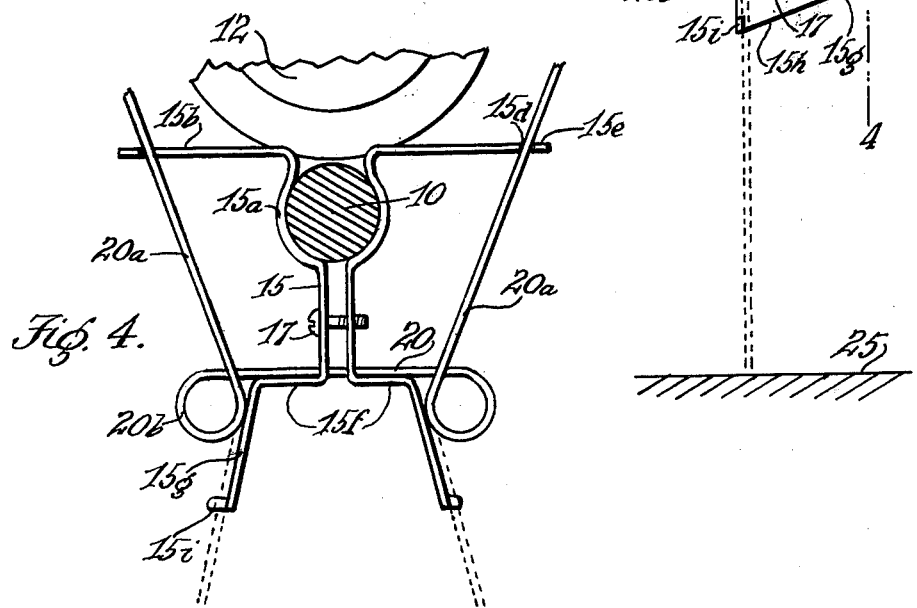
FIG. 4 is a magnified section on the line 4—4 of FIG. 3 showing the coupling swung up by means of full lines, and swung down by means of dotted lines.

The sling frame 15 is of vertical design and composed of companion sections of sturdy strip metal. The sections are spaced closely in the main region of the frame — as seen in FIG. 4 — but they are expanded in upward directions to form a pair of clamping jaws 15a when applied to the round or similar fishing rod shank 10; and the clamping is done by a screw 17 passing through one section 15 to thread through the other, as seen in the same figure.

The clamping jaws 15a are extended at the top with outward horizontal bends 15b. These have oblique frontal edges 15c which terminate with notches 15d in outward lugs 15e at the rear, as seen in the top and bottom center of FIG. 2. The frame 15 is also expanded at the bottom to form a horizontal base 15f. The latter has spreading downward wings 15g whose bottom edges 15h have a rearward decline, as seen in the right-hand center of FIG. 3; and these edges meet outward lugs 15i at the rear, as seen in the right-hand center of FIG. 3 and at the bottom of FIG. 4.

A coupling 20 for the elastic sling 21, made of heavy spring wire, is mounted in the sling frame 15. The coupling is composed mainly of companion arms 20a extending along the sides of the fishing rod; and the arms are rolled with multiple coils 20b at the rear to terminate with their original cross-bar 20, which passes freely through the bottom portion of the sling frame 15, as seen in the lower center of FIG. 4. The front ends of the coupling arms are formed with eyes 20c to which the ends 21a of the sling 21 are tied, as seen at the right-hand end of FIG. 2.

Figure 2:
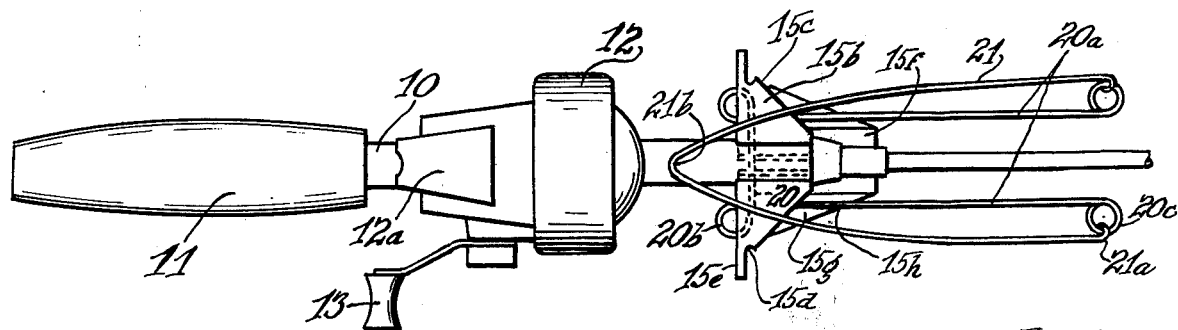
FIG. 2 is a plan view of the left-hand portion of the fishing rod on a larger scale and showing the slingshot attachment with a coupling in the folded position.

The normal position of the sling coupling 20 is as viewed in FIG. 2, where its arms 20a lie close to the fishing rod. This makes the attachment compact when stored or shipped. However, when the slingshot is to be used, the cross-bar 20 of the coupling forms a pivot for rotating the arms 20a upwardly to the vertical dotted-line position in the right-center of FIG. 3. During this motion the arms bear against the oblique edges 15c of the frame 15, and therefore separate to the spread relation seen in FIG. 4. Now, at the extremes of their upward swing the arms 20a fall into the notches 15d and stop in the vertical position mentioned. Since the spreading of the arms is tensioned by the bottom coils 20b, the arms become locked in the notches 15d when they reach the vertical position. The sling 21 may now be directed rearwardly as indicated by dotted lines at the top of FIG. 3 preparatory to a slingshot line-casting operation.

Figure 3:
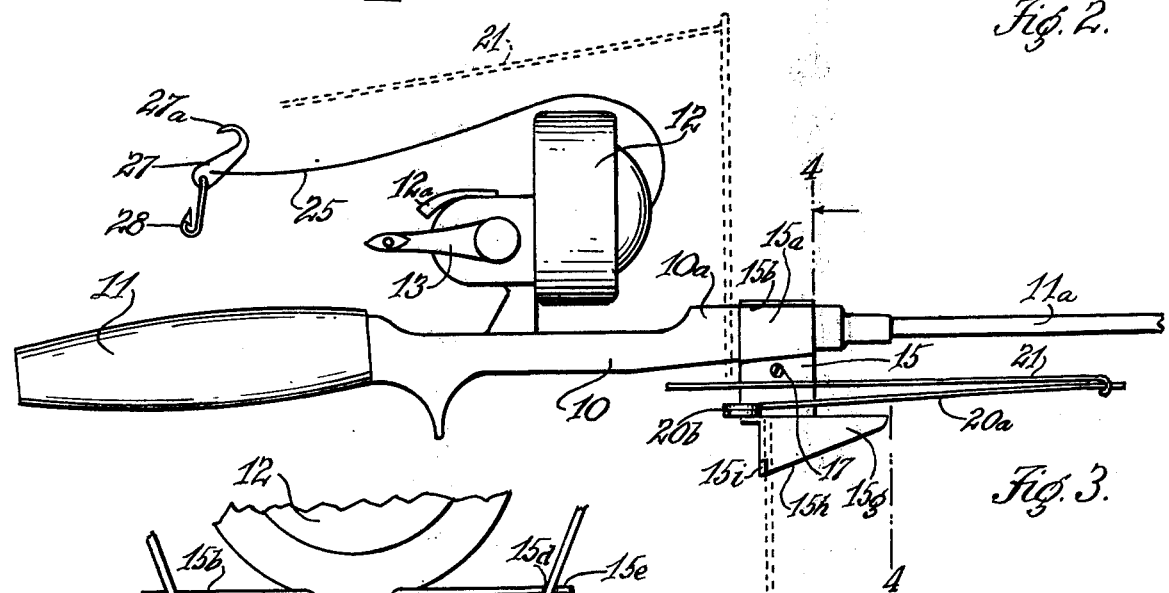
FIG. 3 is an elevation of the showing in FIG. 2.

FIG. 3 shows that the fishing line 25 issues from the front of the reel 12, and takes a rearward turn. The line carries the sinker 27 and a fish hook 28, attached to the sinker as shown or independently to the line. For the present purpose the sinker is made with a hook 27a. To cast the line with a slingshot, this hook is engaged in the pocket 21b of the sling to be pulled back and then released. The reel becomes wound as the line pays out, and locks on the inside to check the return of the line. However, when the line is to be pulled in, a trigger 12a on top of the reel is pressed to allow the operation of the handle 13 to retrieve the line. This mechanism is standard in modern reels. However, in the present case the tip of the fishing rod carries an open coil 30 — seen at the right-hand end of FIG. 1 — for the deposit of the line into the coil before it is retrieved. This coil guides the line on the return toward the reel.

The fishing rod may be backed into the user's lap to facilitate the above operations. After the line has been cast it may be more convenient to rest the rod on the ground or on a support in a boat to await a catch. The present invention uses the sling coupling to provide a frontal rest for the rod. Thus, the coupling arms 20a are first spread slightly to emerge from the notches 15d. They will now gather to the original parallel positions. Now they may be pressed down to engage the edges 15h of the bottom sling frame wings 15g and again become spread as they reach the bottom vertical position indicated by dotted lines at the bottom of FIGS. 3 and 4. The arms now seat against lugs 15i at the end of their downward swing; and their gathering tension holds them against the wings 15g to keep their vertical position. The spread arms are now like the familiar spread prop used to support the forepart of a fishing rod on a handy surface, such as indicated at 25.

It will now be apparent that one unit of the present attachment — the sling coupling — serves three functions: (1) to keep the sling arms close to the fishing rod when the same is not in use; (2) to serve the slingshot action; and (3) to provide a frontal prop for the fishing rod when it is set to rest by itself while awaiting a catch. Further, the sling frame uses simple companion sections of strap metal to procure all the formations for the accommodation and adjustments of the sling coupling.

Further, the attachment is readily adaptable to short fishing rods or conventional ones, whereby to gain the slingshot advantage for casting the line, since all fishing rods have a round or suitable shank for the application of the clamp 15a. Finally, the attachment is of a sturdy nature, durable for rough handling, and devoid of delicate parts.

We claim:

1. A slingshot casting attachment for a fishing rod comprising a frame attachable to the rod, a sling with which a fishing line is engageable, a sling coupling receiving the ends of the sling and mounted in the frame to lie close alongside the rod, such coupling movable to a raised position disposing the sling operatively, and means carried by the frame to lock the coupling when moved to said position.

2. The structure of claim 1, the coupling pivoted to the frame to move as stated.

3. The structure of claim 1, the coupling including companion arms one on each side of the rod.

4. The structure of claim 3, the frame having clamping jaws engageable with the rod and upper cam surfaces to separate the arms on their upward movement to a spread suitable for the sling.

5. The structure of claim 4, said means comprising side extensions of the frame above the jaws and containing terminal notches to seat the coupling arms as spread.

6. The structure of claim 4, the coupling arms formed to become tensioned during their separating movement.

7. The structure of claim 4, the coupling arms having base coils to tension the arms during their separating movement.

8. The structure of claim 1, the coupling also movable in downward direction to the position of a prop for the fishing rod, the frame having lower cam surfaces to separate the arms to a spread securing adequate propping support for the rod, and said cam surfaces containing terminal notches to seat the coupling arms as spread.

9. The structure of claim 1, the coupling having a medial cross-bar pivoted to the frame, and the latter having a base underneath the cross-bar.

10. The structure of claim 1, the coupling composed of companion arms terminating with eyes, and the ends of the sling tied thereto.

* * * * *